(12) United States Patent
Bassani et al.

(10) Patent No.: US 7,744,324 B2
(45) Date of Patent: Jun. 29, 2010

(54) CUP WASHER FOR A FASTENER

(75) Inventors: Eric James Bassani, Haskell, NJ (US); Patrick Joseph Napolitano, Boonton, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 714 days.

(21) Appl. No.: 11/133,598

(22) Filed: May 20, 2005

(65) Prior Publication Data
US 2006/0263172 A1    Nov. 23, 2006

(51) Int. Cl.
F16B 43/02    (2006.01)
F16B 43/00    (2006.01)
F16B 33/00    (2006.01)

(52) U.S. Cl. .................... 411/546; 411/368; 411/531
(58) Field of Classification Search .......... 411/546, 411/631, 544, 531, 543, 369, 538, 542, 537, 411/368
See application file for complete search history.

(56) References Cited

U.S. PATENT DOCUMENTS

| | | | | |
|---|---|---|---|---|
| 1,102,871 A | * | 7/1914 | Carroll | 52/549 |
| 1,670,890 A | * | 5/1928 | Illmer | 411/546 |
| 2,537,575 A | * | 1/1951 | Crowther | 411/134 |
| 3,519,279 A | * | 7/1970 | Wagner | 411/542 |
| 4,102,239 A | * | 7/1978 | Dallas | 411/531 |
| 4,607,984 A | * | 8/1986 | Cassidy | 405/259.6 |
| 4,708,559 A | * | 11/1987 | Locotos | 411/545 |
| 4,862,664 A | * | 9/1989 | Romine | 52/410 |
| 5,139,379 A | * | 8/1992 | Hasan et al. | 411/368 |
| 5,934,855 A | * | 8/1999 | Osterle et al. | 411/545 |
| 5,992,122 A | * | 11/1999 | Rohrmoser et al. | 52/698 |
| 6,497,543 B1 | * | 12/2002 | Lyons | 411/171 |

* cited by examiner

Primary Examiner—Victor Batson
Assistant Examiner—David Reese
(74) Attorney, Agent, or Firm—McCormick, Paulding & Huber LLP

(57) ABSTRACT

A washer for use with a fastener to join two components or plates includes a washer body having an inner portion and an outer portion joined by a connecting wall. The inner portion and the connecting wall form a cavity and the outer portion extends outwardly from the connecting wall to form a flange. The washer joins two plates fabricated from dissimilar material and minimizes stress in the joint. Additionally, the washer minimizes leakage through the joint and can be used with standard fasteners.

14 Claims, 2 Drawing Sheets

CUP WASHER FOR A FASTENER

BACKGROUND OF THE INVENTION

1. Technical Field

The present invention relates to fasteners and, more particularly, to washers therefor.

2. Background Art

Typical fasteners include an elongated shank extending from a proximate end to a distal end with a head disposed on the distal end thereof. The shank typically passes through apertures formed in component layers or plates that the fastener is joining together. The shank of a conventional fastener includes a threaded portion to be secured to an internally threaded nut for joining two or more components between the head of the fastener and the nut.

When a conventional fastener joins two components or plates, a leakage or seepage of water may occur through the joint. The leakage may increase if components are fabricated from dissimilar materials. Since dissimilar materials have different expansion and contraction rates, the components may move relative to each other and to the fastener and form gaps between the apertures in the components and the fastener. This problem may be exacerbated in harsh environments where the temperature differences are greater. Another disadvantage of conventional fasteners is that the material may be subjected to different stress and strain and form cracks that tend to propagate with time, thus, degrading the integrity of the joint.

Therefore, there is a need for a fastener assembly that can be used to join plates fabricated from dissimilar materials and will minimize leakage of fluids through the joint.

SUMMARY OF THE INVENTION

According to the present invention, a washer for use with a fastener to join two components or plates includes a washer body having an inner portion and an outer portion joined by a connecting wall. The inner portion and the connecting wall form a cavity and the outer portion extends outwardly from the connecting wall to form a flange. The washer is sandwiched between a head of the fastener and the plates such that the inner portion of the washer fits into an aperture formed within the first plate and rests on the second plate while at least a portion of the outer portion of the washer rests over the first plate. The cavity of the washer is dimensioned to accommodate a head of the fastener therein and the connecting wall has a connecting wall height, which approximately equals thickness of the first plate.

When the two components or plates are fabricated from dissimilar materials and have different expansion and contraction rates, the washer allows one of the plates to float or move relative to the other plate. The washer, therefore, allows attachment of two plates fabricated from dissimilar materials without subjecting the plates to unacceptable stress and strain. For example, the plates can be fabricated from plastic and metal. Another advantage of the present invention is that the washer minimizes leakage of water and/or air through the joint. The shape of the washer precludes water penetration through the joint. A further advantage of the cup washer of the present invention is that the washer can be used with conventional fasteners.

These and other objects, features and advantages of the present invention will become apparent in light of the detailed description of the best mode embodiment thereof, as illustrated in the accompanying drawings.

DETAILED DESCRIPTION OF A PREFERRED EMBODIMENT

Figure 1:
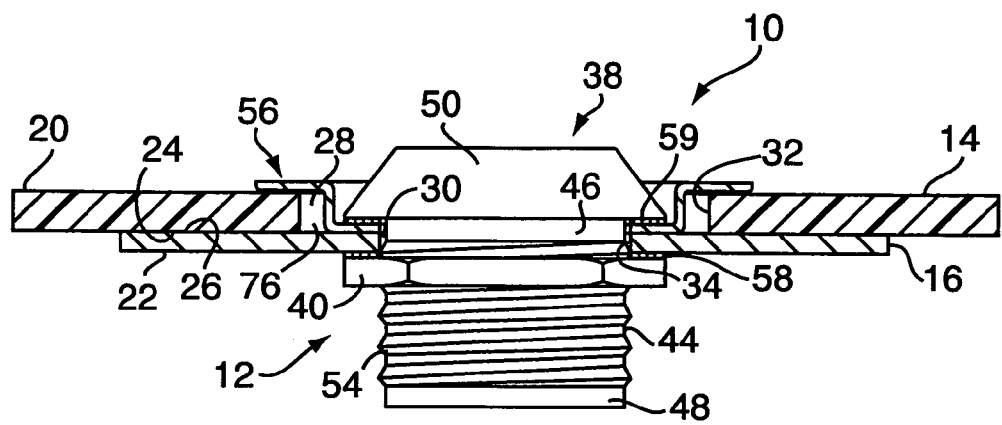
FIG. 1 is a cross-sectional view of a joint formed by a fastener assembly joining two plates.
Figure 2:
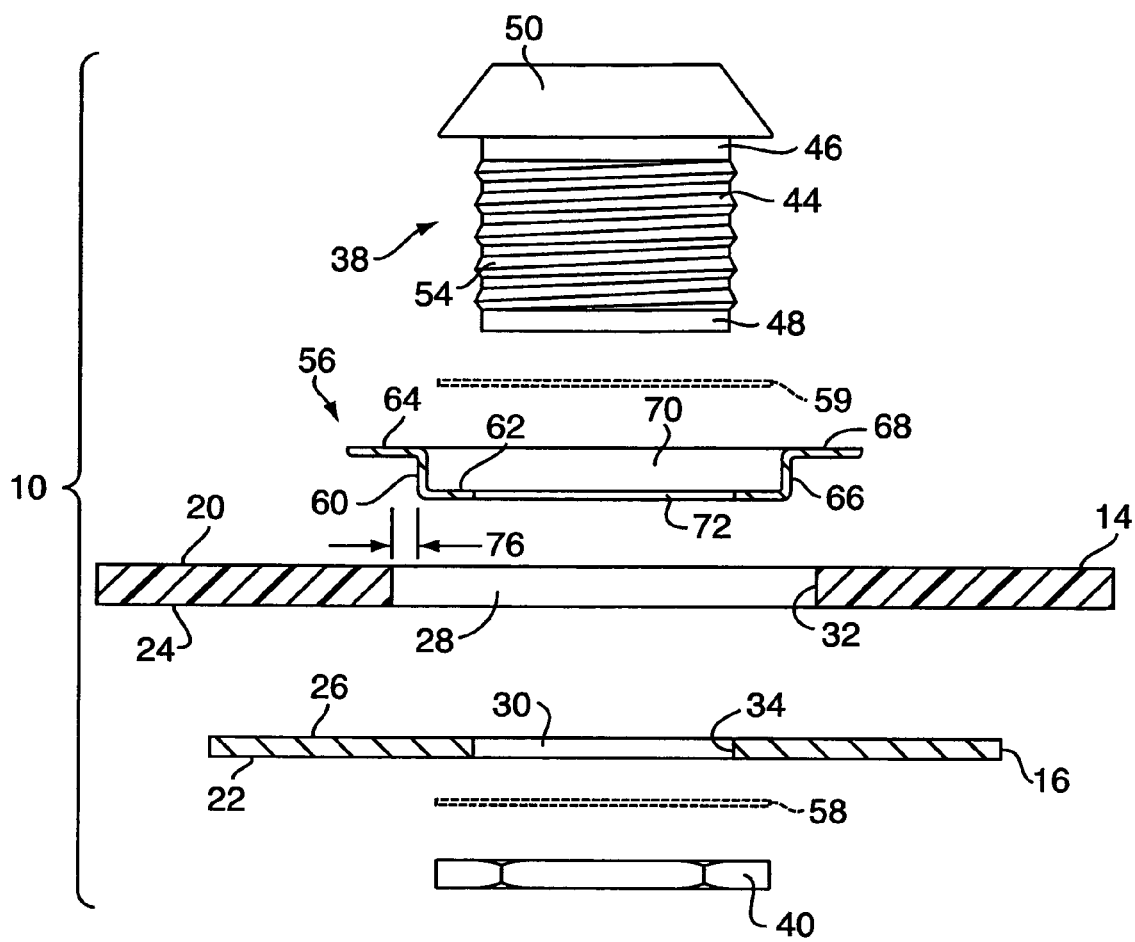
FIG. 2 is an exploded view of the joint of FIG. 1.

Referring to FIGS. 1 and 2, a joint 10 includes a fastener assembly 12 joining a first plate 14 and a second plate 16. Plates 14, 16 include outer plate surfaces 20, 22, facing outwardly, and abutting plate surfaces 24, 26, facing each other, respectively. Each plate also includes a first and second plate aperture 28, 30, respectively, forming an aperture surface 32, 34 within the respective plate.

The fastener assembly 12 includes a fastener 38 and a nut 40. The fastener 38 includes an elongated shank 44, having a proximate end 46 and a distal end 48, and a head 50 disposed on the proximate end of the shank. The shank also includes a threaded portion 54 disposed between the head and the distal end thereof. The nut 40 is internally threaded and is adapted to fit over the distal end of the shank for secure attachment onto the threaded portion of the shank. The fastener assembly 12 also includes a cup washer 56 sandwiched between the head and the first plate 14. A lock washer 58 may be optionally placed within the assembly, between the nut and the second plate, as best seen in FIG. 2. Additionally, a sealing gasket 59 may be optionally placed between the head and the cup washer.

Figure 3:
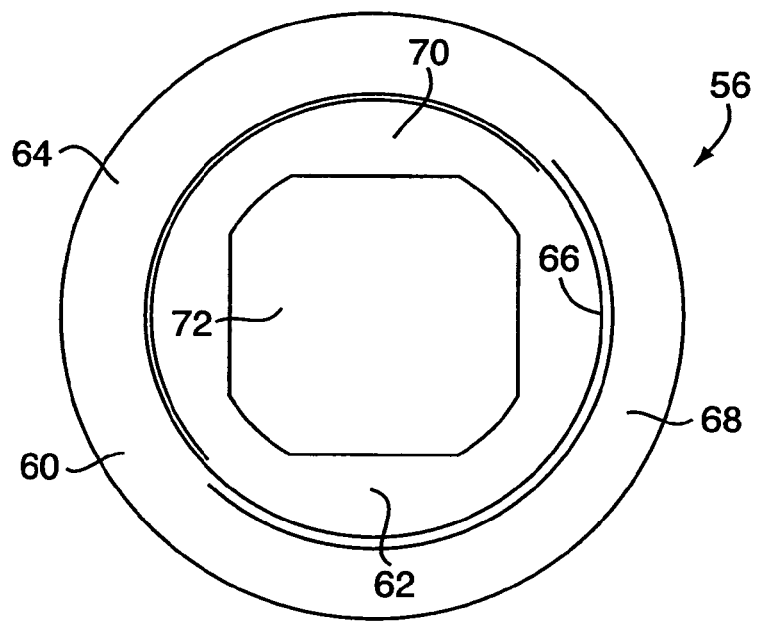
FIG. 3 is a first view of a cup washer of the fastener assembly shown in FIGS. 1 and 2.
Figure 4:
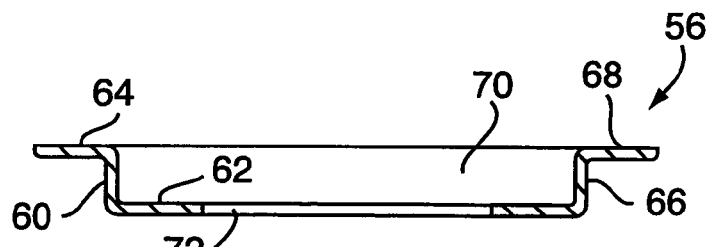
FIG. 4 is a side cross-sectional view of the cup washer of FIG. 3.

Referring to FIGS. 3 and 4, the cup washer 56 includes a washer body 60 having an inner portion 62 and an outer portion 64 joined by a connecting wall 66. The outer portion 64 extends outwardly from the connecting wall 66 forming a flange 68. The inner portion 62 and the connecting wall 66 define a cavity 70 for accommodating the head 50 of the fastener 38 therein, as best seen in FIG. 1. The inner portion 62 includes a washer opening 72 formed centrally therein. The washer opening 72 is dimensioned to accommodate the distal end 48 of the shank 44 of the fastener fitting therethrough. The connecting wall 66 has a connecting wall height defining depth of the cavity 70. In one embodiment, the outer portion 64 and the inner portion 62 are substantially parallel to each other.

The cup washer 56 and the plate apertures 28, 30 are dimensioned such that the second plate aperture 30 is sized to accommodate the shank 44 of the fastener 38 and the first plate aperture 28 is larger than the second plate aperture 30. The connecting wall height of the cup washer 56 approximately equals to the thickness of the first plate 14.

Referring back to FIGS. 1 and 2, to assemble the joint 10, the distal end 48 of the shank 44 of the fastener 38 is placed through the washer opening 72 of the cup washer 56 and then through the first plate aperture 28 and the second plate aperture 30 of the first and second plates 14, 16, respectively. Thus, the cup washer 56 is disposed between the head 50 of the fastener 38 and the plates 14, 16. The washer opening 72 and the second plate opening 30 are substantially in register. The inner portion 62 of the cup washer 56 fits within the first plate aperture 28, with the outer portion 64 resting on the outer surface 20 of the first plate 14 and the inner portion 62 resting against the inner surface 26 of the second plate 16. With the head 50 of the fastener 38 disposed within the cavity 70 of the washer 56, the nut 40 is secured onto the threaded portion 54 shank 44 to join the first and second plates 14, 16.

The second plate aperture 30 is dimensioned to accommodate the inner portion 62 of the washer forming a gap 76 between the aperture surface 32 and the inner portion 62 and to support a portion of the flange 68 on its outer surface 20, as best seen in FIG. 1. As the joint 10 is subjected to harsh environment, wherein the plates 14, 16 expand and contract at different rates, the first plate 14 can expand and contract and move within the assembly. The gap 76 accommodates any movement of the first plate 14 relative to the joint. The flange 68 rests on the outer plate surface 20 allowing the relative movement while the inner portion 62 rests firmly on the abutting plate surface 26 of the second plate.

The washer 56 also minimizes any fluid penetration through the joint 10. The washer 56 seals the joint and precludes any water or air to pass through the joint. Additionally, the cup washer 56 distributes the load across greater surface area, thereby minimizing the stress on the first plate 14. More specifically, the flange 68 and the inner portion 62 provide greater area of engagement and minimize formation of stress areas around the head of the fastener.

One advantage of the present invention is that the cup washer 56 minimizes leakage of water and/or air through the joint 10. When two plates are joined by the fastener assembly 12, the flange 68 of the washer 56 rests against the outer surface 20 of the first plate 14. The inner portion 62 of the cup washer 56 extends underneath the head 50 of the fastener and is tightly sandwiched between the head 50 and the second plate 16, thereby precluding water penetration through the joint. Another advantage of the present invention is that when the first and second plates 14, 16 are fabricated from dissimilar materials and have different expansion and contraction rates, the first plate 14 is enabled to float or move relative to the second plate 16. More specifically, the gap 76 absorbs any expansion and contraction of the first plate 14. The cup washer 56, therefore, allows attachment of two plates fabricated from dissimilar materials without subjecting the plates to unacceptable stress and strain. This especially beneficial in harsh environment that subjects the joint 10 to extensive temperature gradient. In one embodiment, the first plate 14 is fabricated from plastic while the second plate 16 is manufactured from metal. A further advantage of the cup washer of the present invention is that the cup washer can be used with conventional hardware and no modification required to the standard fasteners.

The cup washer can be fabricated from various metals or metal alloys, including steel and aluminum. In one embodiment, as an example, the thickness of the material the washer is fabricated from is approximately eighteen hundredths of an inch (0.18 in). However, depending on the application, the material thickness can vary. The connecting wall height of the washer 56 may also vary depending on the thickness of the first plate 14. In one example, the connecting wall height was fifteen hundredths of an inch (0.15 in). The overhang of the flange 68 onto the outer surface 20 of the first plate 14 can also vary. As an example, the overlap of the flange and the outer surface 20 was approximately one half an inch (0.50 in).

Although this invention has been shown and described with respect to the detailed embodiments thereof, it will be understood by those skilled in the art that various changes in form and detail thereof may be made without departing from the spirit and the scope of the invention. For example, although the washer opening 72 is shown as a double D cutout, the washer opening 72 can have various shapes to accommodate a variety of fasteners.

What is claimed is:

1. An assembly comprising:
   a fastener having an elongated shank having a proximate end and a distal end, the proximate end including a head;
   a nut adapted to be fitted onto the distal end of the shank and to be secured thereonto;
   a washer fitting onto the shank between the head and the nut, the washer having an inner portion and an outer portion joined by a substantially perpendicular connecting wall, the inner portion and the connecting wall forming a cavity and the outer portion extending outwardly from the connecting wall to form a flange, the inner portion having a washer opening formed therein;
   a first plate having a first plate aperture adapted to accept the distal end of the fastener and to accommodate the inner portion of the washer therein, the first plate aperture being larger than an outer diameter of the substantially perpendicular connecting wall and smaller than an outer diameter of the flange to define a gap between the first plate and the substantially perpendicular connecting wall; and
   a second plate having a second plate aperture adapted to accept the distal end of the fastener, wherein the first plate and the second plate are joined together between the flange and the nut with the inner portion of the washer interposed_between the head of the fastener and the nut
   wherein the first plate and the second plate each have an inner plate surface and an outer plate surface with the inner plate surfaces facing each other and the outer plate surfaces facing outwardly, and wherein at least a portion of the flange of the washer and the outer surface of the first plate overlap and interact to permit relative movement.

2. The assembly of claim 1, wherein the inner portion and the outer portion of the washer are integrally connected by the connecting wall.

3. The assembly of claim 1, wherein the inner portion and the outer portion of the washer are substantially parallel to each other.

4. The assembly of claim 1, wherein the washer distributes the load to minimize stress in a joint formed by the assembly.

5. The assembly of claim 1, wherein the cavity of the washer is dimensioned to accommodate a head of the fastener therein.

6. The assembly of claim 1, wherein the washer provides sealing to a joint formed by the assembly.

7. The assembly of claim 1, wherein the first plate aperture is dimensioned to be larger than the second plate aperture.

8. The assembly of claim 7, wherein the inner portion of the washer rests on the abutting surface of the second plate.

9. The assembly of claim 1, wherein the washer is dimensioned to accommodate different expansion rates of the first and second plates.

10. The assembly of claim 1, wherein the and the perpendicular connecting wall allows for expansion and contraction of the first plate.

11. The assembly of claim 1, wherein the first plate is fabricated from plastic and the second plate is fabricated from metal.

12. The assembly of claim 1, wherein the connecting wall has a connecting wall height the connecting wall height approximately equals the thickness of the first plate.

13. The assembly of claim 1, wherein the portion of the flange of the washer and the outer plate surface are substantially flat.

14. A fastener assembly for attaching a first plate and a second plate, the fastener assembly comprising:
- a fastener having an elongated shank having a proximate end and a distal end, the proximate end including a head;
- a nut adapted to be fitted onto the distal end of the shank and to be secured thereonto; and
- a washer fitting onto the shank between the head and the nut the washer having an inner portion and an outer portion joined by a substantially perpendicular connecting wall, the inner portion and the connecting wall forming a cavity and the outer portion extending outwardly from the connecting wall to form a flange, the inner portion having a washer opening formed therein;
- wherein the inner portion of the washer is accommodated within an aperture of the first plate, the aperture being larger than an outer diameter of the substantially perpendicular connecting wall and smaller than an outer diameter of the flange to define a gap between the first plate and the substantially perpendicular connecting wall; and
- wherein at least a portion of the flange of the washer and an outer surface of the first plate overlap and interact to permit relative movement.

\* \* \* \* \*